United States Patent
Ouyang et al.

(10) Patent No.: US 10,552,045 B2
(45) Date of Patent: Feb. 4, 2020

(54) STORAGE OPERATION QUEUE

(71) Applicant: SanDisk Technologies LLC, Plano, TX (US)

(72) Inventors: Jingwen Ouyang, Mountain View, CA (US); Henry Zhang, Saratoga, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 388 days.

(21) Appl. No.: 15/410,746

(22) Filed: Jan. 19, 2017

(65) Prior Publication Data

US 2018/0136840 A1 May 17, 2018

Related U.S. Application Data

(60) Provisional application No. 62/423,129, filed on Nov. 16, 2016.

(51) Int. Cl.
| | |
|---|---|
| *G06F 3/06* | (2006.01) |
| *G06F 12/02* | (2006.01) |
| *G06F 11/14* | (2006.01) |
| *G06F 12/0808* | (2016.01) |

(52) U.S. Cl.
CPC ............ *G06F 3/061* (2013.01); *G06F 3/0659* (2013.01); *G06F 3/0688* (2013.01); *G06F 11/1405* (2013.01); *G06F 12/0246* (2013.01); *G06F 12/0808* (2013.01); *G06F 2212/7205* (2013.01)

(58) Field of Classification Search
CPC ....... G06F 12/00–16; G06F 3/06–0689; G06F 11/14–1497
See application file for complete search history.

(56) References Cited

U.S. PATENT DOCUMENTS

| | | |
|---|---|---|
| 5,253,203 A | 10/1993 | Partovi et al. |
| 7,120,075 B1 | 10/2006 | Gibson et al. |
| 7,920,423 B1 | 4/2011 | Ma et al. |

(Continued)

FOREIGN PATENT DOCUMENTS

WO 2008115720 A2 9/2008

OTHER PUBLICATIONS

PCT International Patent Application No. PCT/US2017/049742 International Search Report and Written Opinion dated Dec. 8, 2017.

(Continued)

*Primary Examiner* — Nicholas J Simonetti
(74) *Attorney, Agent, or Firm* — Vierra Magen Marcus LLP

(57) ABSTRACT

Apparatuses, systems, methods, and computer program products are disclosed for queuing storage operations. An integrated circuit memory element receives a storage operation command associated with a bank of storage locations of a memory element. An integrated circuit memory element queues a storage operation command for execution on a bank of storage locations by determining a storage location in a page register for data associated with the storage operation command. A storage location in a page register includes a subset of available storage locations in the page register. An integrated circuit memory element stores data associated with a storage operation command at a determined storage location in a page register.

20 Claims, 10 Drawing Sheets

(56) References Cited

U.S. PATENT DOCUMENTS

| | | | |
|---|---|---|---|
| 8,462,561 B2 | 6/2013 | Rametta | |
| 8,473,669 B2 | 6/2013 | Sinclair | |
| 8,874,836 B1 | 10/2014 | Hayes et al. | |
| 8,880,780 B2 | 11/2014 | Pyeon et al. | |
| 8,942,248 B1 | 1/2015 | Cheung | |
| 9,037,783 B2 | 5/2015 | Koh et al. | |
| 2005/0253858 A1* | 11/2005 | Ohkami | G06F 12/0862 345/531 |
| 2009/0113116 A1* | 4/2009 | Thompson | G06F 13/385 711/103 |
| 2009/0113121 A1 | 4/2009 | Lee et al. | |
| 2015/0331628 A1 | 11/2015 | Lee et al. | |
| 2017/0123991 A1* | 5/2017 | Sela | G06F 12/0246 |
| 2017/0177487 A1* | 6/2017 | Ware | G06F 13/1689 |

OTHER PUBLICATIONS

International Preliminary Report dated May 21, 2019, in PCT Application No. PCT/US2017/049742, 6 pages.

\* cited by examiner

STORAGE OPERATION QUEUE

CROSS-REFERENCES TO RELATED APPLICATIONS

This patent application claims the benefit of U.S. Provisional Patent Application No. 62/423,129 entitled "STORAGE OPERATION QUEUE" and filed on Nov. 16, 2016 for Jingwen Ouyang et al., the entire contents of which are incorporated herein by reference for all purposes.

TECHNICAL FIELD

The present disclosure, in various embodiments, relates to storage devices and more particularly relates to dynamically queuing storage commands using a page register of a storage device.

BACKGROUND

An array of memory cells may be subdivided into various subarrays so that storage operations can be performed on each subarray independently. However, tracking which operations are being performed on particular subarrays may be difficult to manage at a central location.

SUMMARY

Apparatuses are presented to queue storage operations. In one embodiment, an apparatus includes an integrated circuit ("IC") memory element. An IC memory element, in certain embodiments, receives a storage operation command associated with a bank of storage locations of a memory element. In a further embodiment, an IC memory element queues a storage operation command for execution on a bank of storage locations by determining a storage location in a page register for data associated with the storage operation command. A storage location in a page register may include a subset of available storage locations in the page register. In some embodiments, an IC memory element stores data associated with a storage operation command at a determined storage location in a page register.

An apparatus, in another embodiment, includes means for buffering a plurality of storage operation commands associated with a plurality of subarrays of a non-volatile storage device using a page register of the non-volatile storage device. An apparatus, in a further embodiment, includes means for storing data for a plurality of storage operation commands in a page register such that data for each of the storage operation commands is smaller than a page size of the page register so that data for each of the plurality of storage operation commands is stored concurrently in the page register. In one embodiment, an apparatus includes means for simultaneously processing data stored in a page register for at least a subset of a plurality of storage operation commands.

Systems are presented to queue storage operations. A system, in one embodiment, includes a non-volatile memory medium that includes a page buffer and a controller. In certain embodiments, a controller is configured to receive a plurality of storage operation commands for a non-volatile memory medium. A storage operation command of a plurality of storage operations commands may be for a subarray of a plurality of subarrays of a non-volatile memory medium. A controller, in another embodiment, is configured to determine storage locations in a page buffer for concurrently storing data associated with a plurality of storage operation commands. In various embodiments, a controller is configured to execute at least two of a plurality of storage operation commands simultaneously using data stored in a page buffer associated with at least two storage operation commands.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered to be limiting of its scope, the disclosure is described and explained with additional specificity and detail through the use of the accompanying drawings, in which.

DETAILED DESCRIPTION

Figure 1:
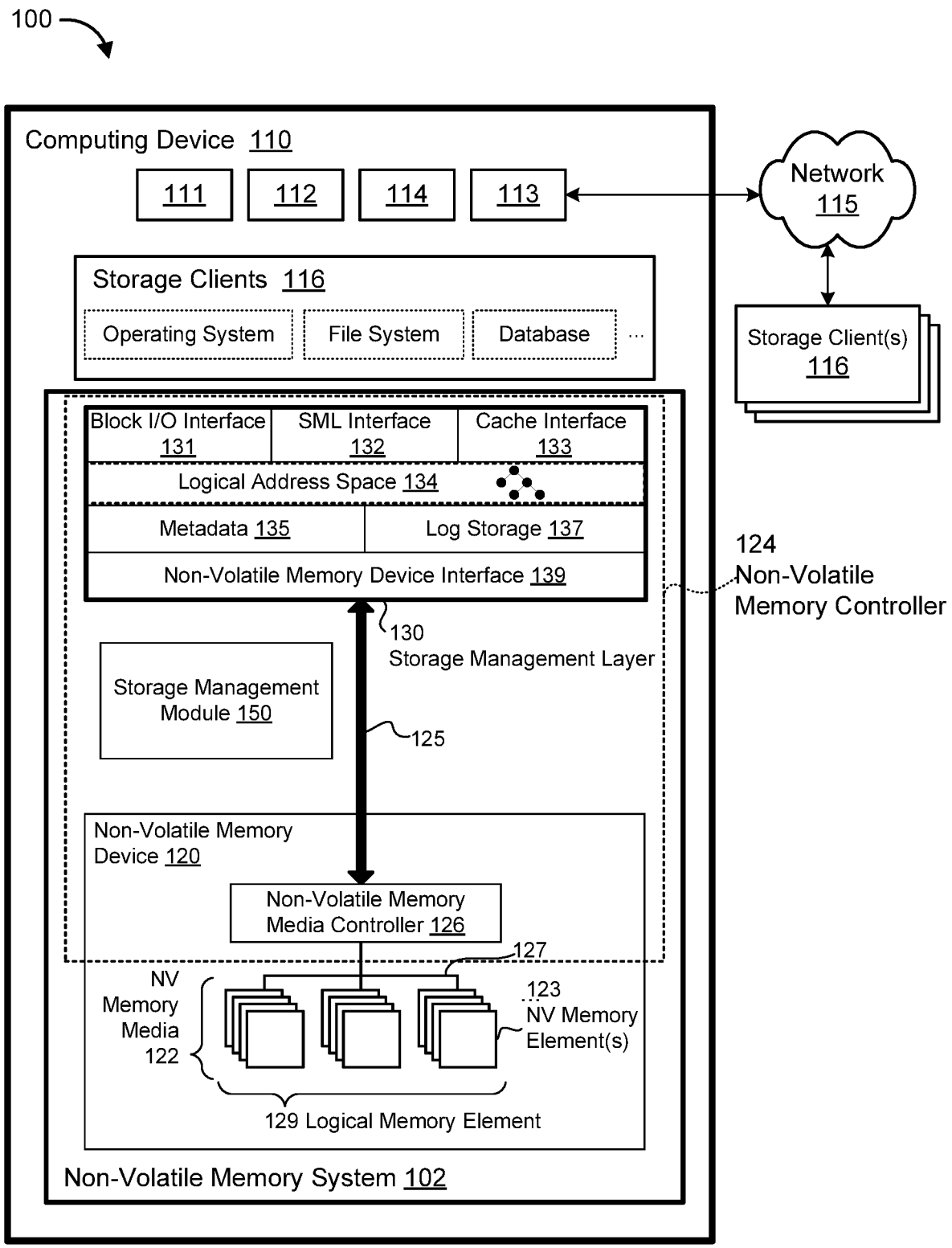
FIG. 1 is a schematic block diagram illustrating one embodiment of a system comprising a storage management module.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "circuit," "module," "apparatus," or "system." Furthermore, aspects of the present disclosure may take the form of a computer program product embodied in one or more non-transitory computer readable storage media storing computer readable and/or executable program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented at least partially in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may include a single instruction, or many instructions, and may even be distributed over several different code segments, among different programs, across several memory devices, or the like. Where a module or portions of a module are implemented in software, the software portions may be stored on one or more computer readable and/or executable storage media. Any combination of one or more computer readable storage media may be utilized. A computer readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object oriented programming language such as Python, Java, Smalltalk, C++, C #, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may alternatively be embodied by or implemented as a component.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

FIG. 1 is a block diagram of one embodiment of a system 100 comprising a storage management module 150. The storage management module 150 may be part of and/or in communication with one or more of a non-volatile memory controller 124, a non-volatile memory media controller 126, a device driver or storage management layer (SML) 130, or the like. The storage management module 150 may operate on a non-volatile memory system 102 of a computing device 110, which may comprise a processor 111, volatile memory 112, and a communication interface 113. The processor 111 may comprise one or more central processing units, one or more general-purpose processors, one or more application-specific processors, one or more virtual processors (e.g., the computing device 110 may be a virtual machine operating within a host), one or more processor cores, or the like. The communication interface 113 may comprise one or more network interfaces configured to communicatively couple the computing device 110 and/or non-volatile memory controller 124 to a communication network 115, such as an Internet Protocol network, a Storage Area Network, or the like.

The computing device 110 may further comprise a non-transitory, computer readable storage media 114. The computer readable storage media 114 may comprise executable instructions configured to cause the computing device 110 (e.g., processor 111) to perform steps of one or more of the methods disclosed herein. Alternatively, or in addition, the storage management module 150 may be embodied as one or more computer readable instructions stored on the non-transitory storage media 114.

The non-volatile memory system 102, in the depicted embodiment, includes a storage management module 150. The storage management module 150, in one embodiment, is configured to queue storage operations for a memory element, volatile and/or non-volatile, using subsets of storage locations in a page register associated with the memory element. For example, when a non-volatile storage device is operating in normal "NAND" mode, a full page of data may be stored in the page register when performing a storage operation, such as a read or write operation. On the other hand, as described herein, when a non-volatile storage device is operating in "burst" mode, which may have a smaller access unit than a full page of data, multiple storage operations can be queued for execution using subsets of the page register to store data associated with storage operations performed on banks of the memory element.

In one embodiment, the storage management module 150 may comprise executable software code, such as a device driver, SML 130, or the like, stored on the computer readable storage media 114 for execution on the processor 111. In another embodiment the storage management module 150 may comprise logic hardware of one or more non-volatile memory devices 120, such as a non-volatile memory media controller 126, a non-volatile memory controller 124, a device controller, a field-programmable gate array (FPGA) or other programmable logic, firmware for an FPGA or other programmable logic, microcode for execution on a microcontroller, an application-specific integrated circuit (ASIC), or the like. In a further embodiment, the storage management module 150 may include a combination of both executable software code and logic hardware.

In one embodiment, the storage management module 150 is configured to receive storage requests from the SML 130 via a bus 125 or the like. The storage management module 150 may be further configured to transfer data to/from the SML 130 and/or storage clients 116 via the bus 125. Accordingly, the storage management module 150, in some embodiments, may comprise and/or be in communication with one or more direct memory access (DMA) modules, remote DMA modules, bus controllers, bridges, buffers, and so on to facilitate the transfer of storage requests and associated data. In another embodiment, the storage management module 150 may receive storage requests as an API call from a storage client 116, as an IO-CTL command, or the like. The storage management module 150 is described in greater detail below with regard to FIGS. 4 and 5.

According to various embodiments, a non-volatile memory controller 124 comprising the storage management module 150 may manage one or more non-volatile memory devices 120. The non-volatile memory device(s) 120 may comprise recording, memory, and/or storage devices, such as solid-state storage device(s), that are arranged and/or partitioned into a plurality of addressable media storage locations. As used herein, a media storage location refers to any physical unit of memory (e.g., any quantity of physical storage media on a non-volatile memory device 120). Memory units may include, but are not limited to: pages, memory divisions, erase blocks, sectors, blocks, collections or sets of physical storage locations (e.g., logical pages, logical erase blocks, described below), or the like.

The non-volatile memory controller 124 may comprise an SML 130, which may present a logical address space 134 to one or more storage clients 116. One example of an SML is the Virtual Storage Layer® of SanDisk Corporation of Milpitas, Calif. Alternatively, each non-volatile memory device 120 may comprise a non-volatile memory media controller 126, which may present a logical address space 134 to the storage clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

The SML 130 may maintain metadata 135, such as a forward index, to map logical addresses of the logical address space 134 to media storage locations on the non-volatile memory device(s) 120. The SML 130 may provide for arbitrary, any-to-any mappings from logical addresses to physical storage resources. As used herein, an "any-to any" mapping may map any logical address to any physical storage resource. Accordingly, there may be no pre-defined and/or pre-set mappings between logical addresses and particular, media storage locations and/or media addresses. As used herein, a media address refers to an address of a memory resource that uniquely identifies one memory resource from another to a controller that manages a plurality of memory resources. By way of example, a media address includes, but is not limited to: the address of a media storage location, a physical memory unit, a collection of physical memory units (e.g., a logical memory unit), a portion of a memory unit (e.g., a logical memory unit address and offset, range, and/or extent), or the like. Accordingly, the SML 130 may map logical addresses to physical data resources of any size and/or granularity, which may or may not correspond to the underlying data partitioning scheme of the non-volatile memory device(s) 120. For example, in some embodiments, the non-volatile memory controller 124 is configured to store data within logical memory units that are formed by logically combining a plurality of physical memory units, which may allow the non-volatile memory controller 124 to support many different virtual memory unit sizes and/or granularities.

As used herein, a logical memory element refers to a set of two or more non-volatile memory elements that are or are capable of being managed in parallel (e.g., via an I/O and/or control bus). A logical memory element may comprise a plurality of logical memory units, such as logical pages, logical memory divisions (e.g., logical erase blocks), and so on. As used herein, a logical memory unit refers to a logical construct combining two or more physical memory units, each physical memory unit on a respective non-volatile memory element in the respective logical memory element (e.g., each non-volatile memory element being accessible in parallel). As used herein, a logical memory division refers to a set of two or more physical memory divisions, each physical memory division on a respective non-volatile memory element in the respective logical memory element.

The logical address space 134 presented by the SML 130 may have a logical capacity, which may correspond to the number of available logical addresses in the logical address space 134 and the size and/or granularity of the data referenced by the logical addresses. For example, the logical capacity of a logical address space 134 comprising 2^32 unique logical addresses, each referencing 2048 bytes (2 KiB) of data may be 2^43 bytes. As used herein, a kibibyte (KiB) refers to 1024 bytes. In some embodiments, the logical address space 134 may be thinly provisioned. As used herein, a "thinly provisioned" logical address space 134 refers to a logical address space 134 having a logical capacity that exceeds the physical capacity of the underlying non-volatile memory device(s) 120. For example, the SML 130 may present a 64-bit logical address space 134 to the storage clients 116 (e.g., a logical address space 134 referenced by 64-bit logical addresses), which may exceed the physical capacity of the underlying non-volatile memory devices 120. The large logical address space 134 may allow storage clients 116 to allocate and/or reference contiguous ranges of logical addresses, while reducing the chance of naming conflicts. The SML 130 may leverage the any-to-any mappings between logical addresses and physical storage resources to manage the logical address space 134 independently of the underlying physical storage devices 120. For example, the SML 130 may add and/or remove physical storage resources seamlessly, as needed, and without changing the logical addresses used by the storage clients 116.

The non-volatile memory controller 124 may be configured to store data in a contextual format. As used herein, a contextual format refers to a self-describing data format in which persistent contextual metadata is stored with the data on the physical storage media 122. The persistent contextual metadata provides context for the data with which it is stored. In certain embodiments, the persistent contextual metadata uniquely identifies the data with which the persistent contextual metadata is stored. For example, the persistent contextual metadata may uniquely identify a sector or block of data owned by a storage client 116 from other sectors or blocks of data owned by the storage client 116. In a further embodiment, the persistent contextual metadata identifies an operation that is performed on the data. In a further embodiment, the persistent contextual metadata identifies a sequence of operations performed on the data. In a further embodiment, the persistent contextual metadata identifies security controls, a data type, or other attributes of the data. In a certain embodiment, the persistent contextual metadata identifies at least one of a plurality of aspects, including data type, a unique data identifier, an operation, and a sequence of operations performed on the data.

The persistent contextual metadata may include, but is not limited to: a logical address of the data, an identifier of the data (e.g., a file name, object id, label, unique identifier, or the like), reference(s) to other data (e.g., an indicator that the data is associated with other data), a relative position or offset of the data with respect to other data (e.g., file offset, etc.), data size and/or range, and the like. The contextual data format may comprise a packet format comprising a data segment and one or more headers. Alternatively, a contextual data format may associate data with context information in other ways (e.g., in a dedicated index on the non-volatile memory media 122, a memory division index, or the like).

In some embodiments, the contextual data format may allow data context to be determined and/or reconstructed based upon the contents of the non-volatile memory media 122, and independently of other metadata, such as the arbitrary, any-to-any mappings discussed above. Since the media location of data is independent of the logical address of the data, it may be inefficient or impossible to determine the context of data based solely upon the media location or media address of the data. Storing data in a contextual format on the non-volatile memory media 122 may allow data context to be determined without reference to other metadata. For example, the contextual data format may allow the metadata to be reconstructed based only upon the contents of the non-volatile memory media 122 (e.g., reconstruct the any-to-any mappings between logical addresses and media locations).

In some embodiments, the non-volatile memory controller 124 may be configured to store data on one or more asymmetric, write-once media 122, such as solid-state storage media. As used herein, a "write once" storage medium refers to a storage medium that is reinitialized (e.g., erased) each time new data is written or programmed thereon. As used herein, an "asymmetric" storage medium refers to a storage medium 122 having different latencies for different storage operations. Many types of solid-state storage media are asymmetric; for example, a read operation may be much faster than a write/program operation, and a write/program operation may be much faster than an erase operation (e.g., reading the media may be hundreds of times faster than erasing, and tens of times faster than programming the media).

The memory media 122 may be partitioned into memory divisions that can be erased as a group (e.g., erase blocks) in order to, inter alia, account for the asymmetric properties of the media 122 or the like. As such, modifying a single data segment in-place may require erasing the entire erase block comprising the data, and rewriting the modified data to the erase block, along with the original, unchanged data. This may result in inefficient "write amplification," which may excessively wear the media 122. Therefore, in some embodiments, the non-volatile memory controller 124 may be configured to write data out-of-place. As used herein, writing data "out-of-place" refers to writing data to different media storage location(s) rather than overwriting the data "in-place" (e.g., overwriting the original physical location of the data). Modifying data out-of-place may avoid write amplification, since existing, valid data on the erase block with the data to be modified need not be erased and recopied. Moreover, writing data out-of-place may remove erasure from the latency path of many storage operations (e.g., the erasure latency is no longer part of the critical path of a write operation).

The non-volatile memory controller 124 may comprise one or more processes that operate outside of the regular path for servicing of storage operations (e.g., the "path" for performing a storage operation and/or servicing a storage request). As used herein, the "path for servicing a storage request" or "path for servicing a storage operation" (also referred to as the "critical path") refers to a series of processing operations needed to service the storage operation or request, such as a read, write, modify, or the like. The path for servicing a storage request may comprise receiving the request from a storage client 116, identifying the logical addresses of the request, performing one or more storage operations on non-volatile memory media 122, and returning a result, such as acknowledgement or data. Processes that occur outside of the path for servicing storage requests may include, but are not limited to: a groomer, de-duplication, and so on. These processes may be implemented autonomously and in the background, so that they do not interfere with or impact the performance of other storage operations and/or requests. Accordingly, these processes may operate independent of servicing storage requests.

In some embodiments, the non-volatile memory controller 124 comprises a groomer, which is configured to reclaim memory divisions (e.g., logical or physical erase blocks) for reuse, using a garbage collection or other storage capacity recovery process. The write out-of-place paradigm implemented by the non-volatile memory controller 124 may result in obsolete or invalid data remaining on the non-volatile memory media 122. For example, overwriting data X with data Y may result in storing Y on a new memory division (e.g., rather than overwriting X in place), and updating the any-to-any mappings of the metadata to identify Y as the valid, up-to-date version of the data. The obsolete version of the data X may be marked as invalid, but may not be immediately removed (e.g., erased), since, as discussed above, erasing X may involve erasing an entire memory division, which is a time-consuming operation and may result in write amplification. Similarly, data that is no longer is use (e.g., deleted or trimmed data) may not be immediately removed. The non-volatile memory media 122 may accumulate a significant amount of invalid data.

A groomer process may operate outside of the critical path for servicing storage operations. The groomer process may reclaim memory divisions so that they can be reused for other storage operations. As used herein, reclaiming a memory division refers to erasing the memory division so that new data may be stored/programmed thereon. Reclaiming a memory division may comprise relocating valid data on the memory division to a new location. The groomer may identify memory divisions for reclamation based upon one or more factors, which may include, but are not limited to: the amount of invalid data in the memory division, the amount of valid data in the memory division, wear on the memory division (e.g., number of erase cycles), time since the memory division was programmed or refreshed, and so on.

The non-volatile memory controller 124 may be further configured to store data in a log format. As described above, a log format refers to a data format that defines an ordered sequence of storage operations performed on a non-volatile memory media 122. In some embodiments, the log format comprises storing data in a pre-determined sequence of media addresses of the non-volatile memory media 122 (e.g., within sequential pages and/or erase blocks of the media 122). The log format may further comprise associating data (e.g., each packet or data segment) with respective sequence indicators. The sequence indicators may be applied to data individually (e.g., applied to each data packet) and/or to data groupings (e.g., packets stored sequentially on a memory division, such as an erase block). In some embodiments, sequence indicators may be applied to memory divisions when the memory divisions are reclaimed (e.g., erased), as described above, and/or when the memory divisions are first used to store data.

In some embodiments the log format may comprise storing data in an "append only" paradigm. The non-volatile memory controller 124, using the log storage module 137 described below or the like, may maintain a current append point at a media address of the non-volatile memory device 120. The append point may be a current memory division and/or offset within a memory division. Data may then be sequentially appended from the append point. The sequential ordering of the data, therefore, may be determined based upon the sequence indicator of the memory division of the data in combination with the sequence of the data within the memory division. Upon reaching the end of a memory division, the non-volatile memory controller 124 may identify the "next" available memory division (e.g., the next memory division that is initialized and ready to store data). The groomer may reclaim memory divisions comprising invalid, stale, and/or deleted data, to ensure that data may continue to be appended to the media log.

The log format described herein may allow valid data to be distinguished from invalid data based upon the contents of the non-volatile memory media 122, and independently of other metadata. As discussed above, invalid data may not be removed from the non-volatile memory media 122 until the memory division comprising the data is reclaimed. Therefore, multiple "versions" of data having the same context may exist on the non-volatile memory media 122 (e.g., multiple versions of data having the same logical addresses). The sequence indicators associated with the data may be used to distinguish invalid versions of data from the current, up-to-date version of the data; the data that is the most recent in the log is the current version, and previous versions may be identified as invalid.

The storage management layer 130 may be configured to provide storage services to one or more storage clients 116. The storage clients 116 may include local storage clients 116 operating on the computing device 110 and/or remote, storage clients 116 accessible via the network 115 and/or network interface 113. The storage clients 116 may include, but are not limited to: operating systems, file systems, database applications, server applications, kernel-level processes, user-level processes, applications, and the like.

The storage management layer 130 comprises and/or is communicatively coupled to one or more non-volatile memory devices 120. The one or more non-volatile memory devices 120 may include different types of non-volatile memory devices including, but not limited to: solid-state storage devices, hard drives, SAN storage resources, or the like. The one or more non-volatile memory devices 120 may comprise one or more respective non-volatile memory media controllers 126 and non-volatile memory media 122. As illustrated in FIG. 1, The SML 130 may provide access to the one or more non-volatile memory devices 120 via a traditional block I/O interface 131. Additionally, the SML 130 may provide access to enhanced functionality (e.g., a large, virtual address space 134) through the SML interface 132. The metadata 135 may be used to manage and/or track storage operations performed through any of the Block I/O interface 131, SML interface 132, cache interface 133, or other, related interfaces.

The cache interface 133 may expose cache-specific features accessible via the storage management layer 130. Also, in some embodiments, the SML interface 132 presented to the storage clients 116 provides access to data transformations implemented by the one or more non-volatile memory devices 120 and/or the one or more non-volatile memory media controllers 126.

The SML 130 may provide storage services through one or more interfaces, which may include, but are not limited to: a block I/O interface, an extended storage management layer interface, a cache interface, and the like. The SML 130 may present a logical address space 134 to the storage clients 116 through one or more interfaces. As discussed above, the logical address space 134 may comprise a plurality of logical addresses, each corresponding to respective media locations the on one or more non-volatile memory devices 120. The SML 130 may maintain metadata 135 comprising any-to-any mappings between logical addresses and media locations, as described above.

The SML 130 may further comprise a log storage module 137 that is configured to store data in a contextual, log format. The contextual, log data format may comprise associating data with persistent contextual metadata, such as the logical address of the data, or the like. The contextual, log format may further comprise associating data with respective sequence identifiers on the non-volatile memory media 122, which define an ordered sequence of storage operations performed on the one or more non-volatile memory devices 120, as described above.

The SML 130 may further comprise a non-volatile memory device interface 139 configured to transfer data, commands, and/or queries to the one or more non-volatile memory devices 120 over a bus 125, which may include, but is not limited to: a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The non-volatile memory device interface 139 may communicate with the one or more non-volatile memory devices 120 using input-output control (IO-CTL) command(s), IO-CTL command extension(s), remote direct memory access, or the like.

The communication interface 113 may comprise one or more network interfaces configured to communicatively couple the computing device 110 and/or the non-volatile memory controller 124 to a network 115 and/or to one or more remote, network-accessible storage clients 116. The storage clients 116 may include local storage clients 116 operating on the computing device 110 and/or remote, storage clients 116 accessible via the network 115 and/or the network interface 113. The non-volatile memory controller 124 comprises one or more non-volatile memory devices 120. Although FIG. 1 depicts a single non-volatile memory device 120, the disclosure is not limited in this regard and could be adapted to incorporate any number of non-volatile memory devices 120.

The non-volatile memory device 120 may comprise non-volatile memory media 122, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), resistive RAM (RRAM), programmable metallization cell (PMC), conductive-bridging RAM (CBRAM), magneto-resistive RAM (MRAM), dynamic RAM (DRAM), phase change RAM (PRAM or PCM), magnetic storage media (e.g., hard disk, tape), optical storage media, or the like. While the non-volatile memory media 122 is referred to herein as "memory media," in various embodiments, the non-volatile memory media 122 may more generally comprise a non-volatile recording media capable of recording data, which may be referred to as a non-volatile memory media, a non-volatile storage media, or the like. Further, the non-volatile memory device 120, in various embodiments, may comprise a non-volatile recording device, a non-volatile memory device, a non-volatile storage device, or the like.

The non-volatile memory media 122 may comprise one or more non-volatile memory elements 123, which may include, but are not limited to: chips, packages, planes, die, and the like. A non-volatile memory media controller 126 may be configured to manage storage operations on the non-volatile memory media 122, and may comprise one or more processors, programmable processors (e.g., field-programmable gate arrays), or the like. In some embodiments, the non-volatile memory media controller 126 is configured to store data on and/or read data from the non-volatile memory media 122 in the contextual, log format described above, and to transfer data to/from the non-volatile memory device 120, and so on.

The non-volatile memory media controller 126 may be communicatively coupled to the non-volatile memory media 122 by way of a bus 127. The bus 127 may comprise an I/O bus for communicating data to/from the non-volatile memory elements 123. The bus 127 may further comprise a control bus for communicating addressing and other command and control information to the non-volatile memory elements 123. In some embodiments, the bus 127 may communicatively couple the non-volatile memory elements 123 to the non-volatile memory media controller 126 in parallel. This parallel access may allow the non-volatile memory elements 123 to be managed as a group, forming a logical memory element 129. As discussed above, the logical memory element may be partitioned into respective logical memory units (e.g., logical pages) and/or logical memory divisions (e.g., logical erase blocks). The logical memory units may be formed by logically combining physical memory units of each of the non-volatile memory elements. For example, if the non-volatile memory media 122 comprises twenty-five (25) non-volatile memory elements, each logical memory unit may comprise twenty-five (25) pages (e.g., a page of each element of non-volatile memory media 122).

The non-volatile memory controller 124 may comprise an SML 130 and the non-volatile memory media controller 126. The SML 130 may provide storage services to the storage clients 116 via one or more interfaces 131, 132, and/or 133. In some embodiments, the SML 130 provides a block-device I/O interface 131 through which storage clients 116 perform block-level I/O operations. Alternatively, or in addition, the SML 130 may provide a storage management layer (SML) interface 132, which may provide other storage services to the storage clients 116. In some embodiments, the SML interface 132 may comprise extensions to the block device interface 131 (e.g., storage clients 116 may access the SML interface 132 through extensions to the block device interface 131). Alternatively, or in addition, the SML interface 132 may be provided as a separate API, service, and/or library. The SML 130 may be further configured to provide a cache interface 133 for caching data using the non-volatile memory system 102.

As described above, the SML 130 may present a logical address space 134 to the storage clients 116 (e.g., through the interfaces 131, 132, and/or 133). The SML 130 may maintain metadata 135 comprising any-to-any mappings between logical addresses in the logical address space 134 and media locations on the non-volatile memory device 120. The metadata 135 may comprise a logical-to-physical mapping structure with entries that map logical addresses in the logical address space 134 and media locations on the non-volatile memory device 120. The logical-to-physical mapping structure of the metadata 135, in one embodiment, is sparsely populated, with entries for logical addresses for which the non-volatile memory device 120 stores data and with no entries for logical addresses for which the non-volatile memory device 120 does not currently store data. The metadata 135, in certain embodiments, tracks data at a block level, with the SML 130 managing data as blocks.

The non-volatile memory system 102 may further comprise a log storage module 137, which, as described above, may be configured to store data on the non-volatile memory device 120 in a contextual, log format. The contextual, log data format may comprise associating data with a logical address on the non-volatile memory media 122. The contextual, log format may further comprise associating data with respective sequence identifiers on the non-volatile memory media 122, which define an ordered sequence of storage operations performed on the non-volatile memory media 122, as described above. The non-volatile memory controller 124 may further comprise a non-volatile memory device interface 139 that is configured to transfer data, commands, and/or queries to the non-volatile memory media controller 126 over a bus 125, as described above.

Figure 2:
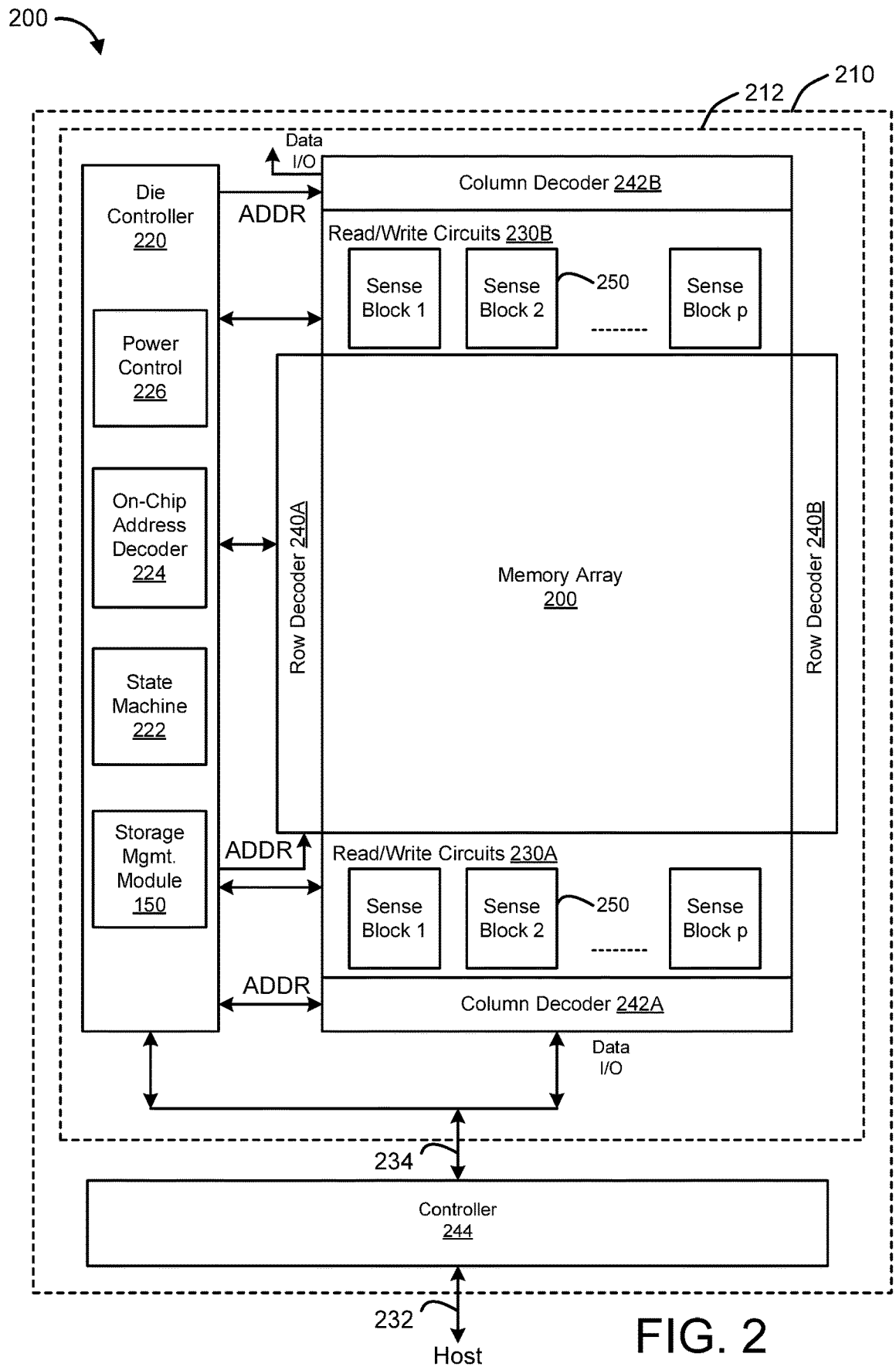
FIG. 2 is a schematic block diagram illustrating one embodiment of a memory element.

FIG. 2 depicts an embodiment of a non-volatile storage device 210 that may include one or more memory die or chips 212. The non-volatile storage device 210 may be substantially similar to the non-volatile memory device 120 described with reference to FIG. 1. Memory die 212, in some embodiments, includes an array 200 (two-dimensional or three dimensional) of memory cells, die controller 220, and read/write circuits 230A/230B. In one embodiment, access to the memory array 200 by the various peripheral circuits is implemented in a symmetric fashion, on opposite sides of the array, so that the densities of access lines and circuitry on each side are reduced by half. The read/write circuits 230A/230B, in a further embodiment, include multiple sense blocks 250 which allow a page of memory cells to be read or programmed in parallel.

The memory array 200, in various embodiments, is addressable by word lines via row decoders 240A/240B and by bit lines via column decoders 242A/242B. In some embodiments, a controller 244 is included in the same memory device 210 (e.g., a removable storage card or package) as the one or more memory die 212. Commands and data are transferred between the host and controller 244 via lines 232 and between the controller and the one or more memory die 212 via lines 234. One implementation can include multiple chips 212.

Die controller 220, in one embodiment, cooperates with the read/write circuits 230A/230B to perform memory/storage operations on the memory array 200. The die controller 220, in certain embodiments, includes a storage management module 150, a state machine 222, an on-chip address decoder 224, and a power control circuit 226. The storage management module 150, in one embodiment, is configured to receive a storage operation command for a bank of storage locations of the memory array 200, queue the storage operation command for execution using a subset of available storage locations in a page register associated with the memory array 200, and store data associated with the storage operation command at a storage location in the page register until the storage operation command is completed, executed, performed, or the like. The storage management module 150, in certain embodiments, may include software of a device driver, and/or hardware in a device controller 244, a die controller 220 and/or state machine 222.

The state machine 222, in one embodiment, provides chip-level control of memory or storage operations. The on-chip address decoder 224 provides an address interface to convert between the address that is used by the host or a memory controller to the hardware address used by the decoders 240A, 240B, 242A, 242B. The power control circuit 226 controls the power and voltages supplied to the word lines and bit lines during memory operations. In one embodiment, power control circuit 226 includes one or more charge pumps that can create voltages larger than the supply voltage.

Figure 3:
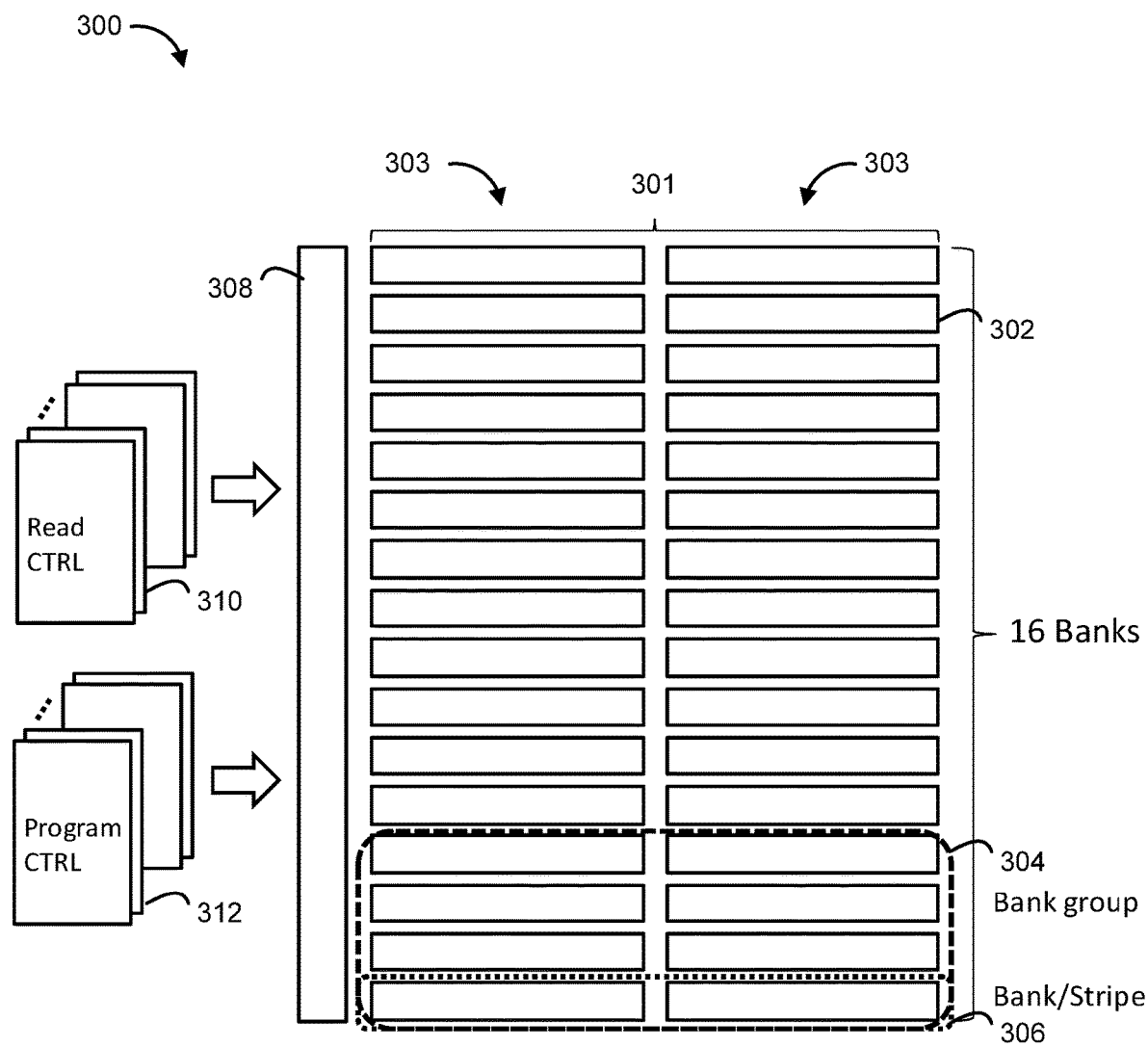
FIG. 3 is a schematic block diagram illustrating another embodiment of a memory element.

FIG. 3 depicts one embodiment of a memory element 300, such as the non-volatile storage device 210 described above, that includes an array 301 of memory cells 302. In one embodiment, the array 301 is divided into two subarrays 303 of memory cells 302. One of skill in the art will recognize, in light of this specification, that the memory array 301 could be divided into any number of subarrays 303. Furthermore, in the depicted embodiment, each row of memory cells 302 comprises a bank 306 of memory cells 302 (e.g. a set of memory cells 302) and a group of memory cell banks 306 comprising a bank group 304. For example, as illustrated in FIG. 3, the memory element 300 includes two subarrays 303 and sixteen banks 306 of memory cells 302, which may be grouped into four different bank groups 304.

In a further embodiment, the memory element 300 may have an associated page register/page buffer 308. As used herein, a page register 308 is a storage area used for temporarily storing data while it is transferred to (e.g., for a write command) or from (e.g., for a read command) the memory array 301. In certain embodiment, the page register comprises a plurality of different storage locations comprising a plurality of data latches that can be used to store addresses for the memory array 301, data to be stored at the addresses in the memory array 301, or the like.

In one embodiment, when the memory element 300 is operating in a normal mode, such as a NAND mode for a non-volatile NAND storage device, an access unit for a page register 308 may be a full page of data, e.g., 512B, 4 kB, 8 kB, 16 kB per page, or the like. On the other hand, when the memory element 300 is performing in "burst" mode, the access unit for a page register 308 may be smaller, e.g., 4B, 8B, 16B per page, or the like, which may correspond to a storage size of a bank 306 or bank group 304. As used herein, "burst" mode may be a mode of the memory element 300 where the memory element 300 processes high-speed synchronous read 310 and program/write 312 operations on banks 306 or bank groups 304 of the memory array 301.

Accordingly, when running in "burst" mode, a subset or a portion of the page register 308 may be associated with a bank 306 or bank group 304 of the memory array 301 and may be utilized to perform storage operation commands, e.g., a read 310 or write 312 command, on the bank 306 or the bank group 304 of memory cells 302. Thus, the unused available storage space in the page register 308 may be used to queue, buffer, or the like different storage operations for a bank 306 or bank group 304 of memory cells 302. Furthermore, multiple different storage operations may be queued in the page register 308 and performed synchronously on different banks 306 or bank groups 304 of memory cells 302 of the memory element 300. In one embodiment, the memory array 301 may be managed by a single state machine 222 that manages queuing and processing of storage operations for each bank 306 or bank group 304. In certain embodiments, multiple state machines 222 may independently manage queuing and processing of storage operations for each bank 306 or bank group 304.

Figure 4:
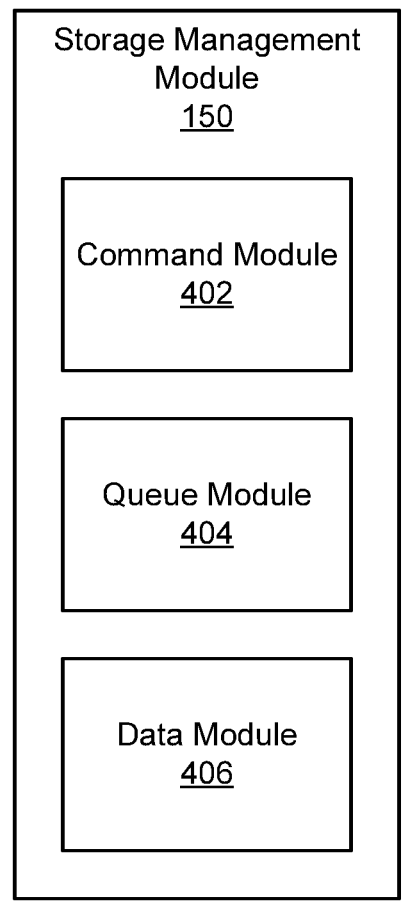
FIG. 4 is a schematic block diagram illustrating one embodiment of a storage management module.

FIG. 4 depicts one embodiment of a storage management module 150. The storage management module 150 may be substantially similar to the storage management module 150 described above with regard to FIG. 1. In the depicted embodiment, the storage management module 150 includes a command module 402, a queue module 404, and a data module 406, which are described in more detail below.

The command module 402, in one embodiment, is configured to receive one or more storage operation commands associated with a bank 306 of storage locations, e.g., memory cells 302, of a memory element 300. As used herein, a storage operation command may include a command intended to trigger an action, activity, or the like on the memory element 300, the memory array 301, a bank 306, a bank group 304, a memory cell 302, or the like. The storage operation command, for example, may include a read command, a write command, a program flush command, an extended buffer flush command, a refresh flush command, and/or the like. As described above, the command module 402 may receive a storage operation command from a storage client 116.

In one embodiment, the command module 402 receives a storage operation command for a bank 306 of memory cells 302, for a bank group 304 of memory cells 302, and/or the like of a memory array 301 of a memory element 300. In some embodiments, the command module 402 receives one or more addresses as part of the storage operation command that correspond to the bank(s) 306 of memory cells that are associated with the storage operation.

The queue module 404, in one embodiment, is configured to queue the storage operation command for execution by determining a storage location in a page register 308 for data associated with the storage operation command. As used herein, a storage location in the page register 308 may include one or more data latches, data registers, and/or the like that may be accessible using an address, an identifier, or the like. In such an embodiment, the storage location in the page register 308 may be a subset, a portion, a part, or the like of the available storage locations in the page register 308. For example, the storage location in the page register 308, which may be configured to store data for a full page of 4 kB, may be a 1B or 2B set of data latches that are associated with a bank 306 of memory cells 302 in the memory element 300.

The queue module 404 may track an order in which storage command operations are received, and the locations within the page register where the address and/or the data for the storage command operations are stored. For example, the queue module 404 may be located on, or otherwise a part of a controller, such as a state machine 222, that determines a storage location in a page register 308 for data associated with a storage operation command, and an order of execution for a plurality of received storage operations commands that are queued for execution. In another example, the queue module 404 may be located on, or otherwise part of, multiple state machines 222 that each manage storage locations in the page register 308 that are associated with different banks 306 or bank groups 304 of memory cells 302 in the memory element 300. In such an embodiment, the queue module 404, for each state machine 222, determines a storage location in the page register 308 for data associated with the storage operation command, and determines an order of execution for the plurality of received storage operation commands that are queued for execution.

The data module 406, in one embodiment, is configured to receive data associated with the received storage operation command, and store the received data in a predetermined storage location in the page register 308 until the storage operation command is ready to be executed. The data module 406, for example, may receive data associated with a write command and store the data in the storage location, e.g., one or more data latches, in the page register 308 while the write command is queued for execution. When the write command is selected to be executed, committed, or the like, the data module 406 may then access the data to be written to the bank 306 or bank group 304 of the memory array 301 from the storage location in the page register 308, and write or program the data to the memory array 301. In another example, the data module 406 may receive data from a bank 306 or bank group 304 of the memory element 300 in response to a read request command, and may store the read data in a storage location in the page register 308 until the read request command is selected from the queue to be committed, finished, executed, or the like.

Accordingly, the storage management module 150 provides a dynamic queuing system to manage multiple storage operations for individual banks 306 or bank groups 304 using portions of a page register 308. In this manner, multiple storage operations may be performed synchronously on a memory array 301, e.g., within each bank group 304, or the like. Furthermore, unnecessary execution of storage operations on portions of the memory array 301 that are not related to the portion of the memory array 301 affected by the storage operation may be avoided by using the page register 308 to queue storage operations that are intended for individual banks 306 or bank groups 304, and not the entire memory array 301.

Figure 5:
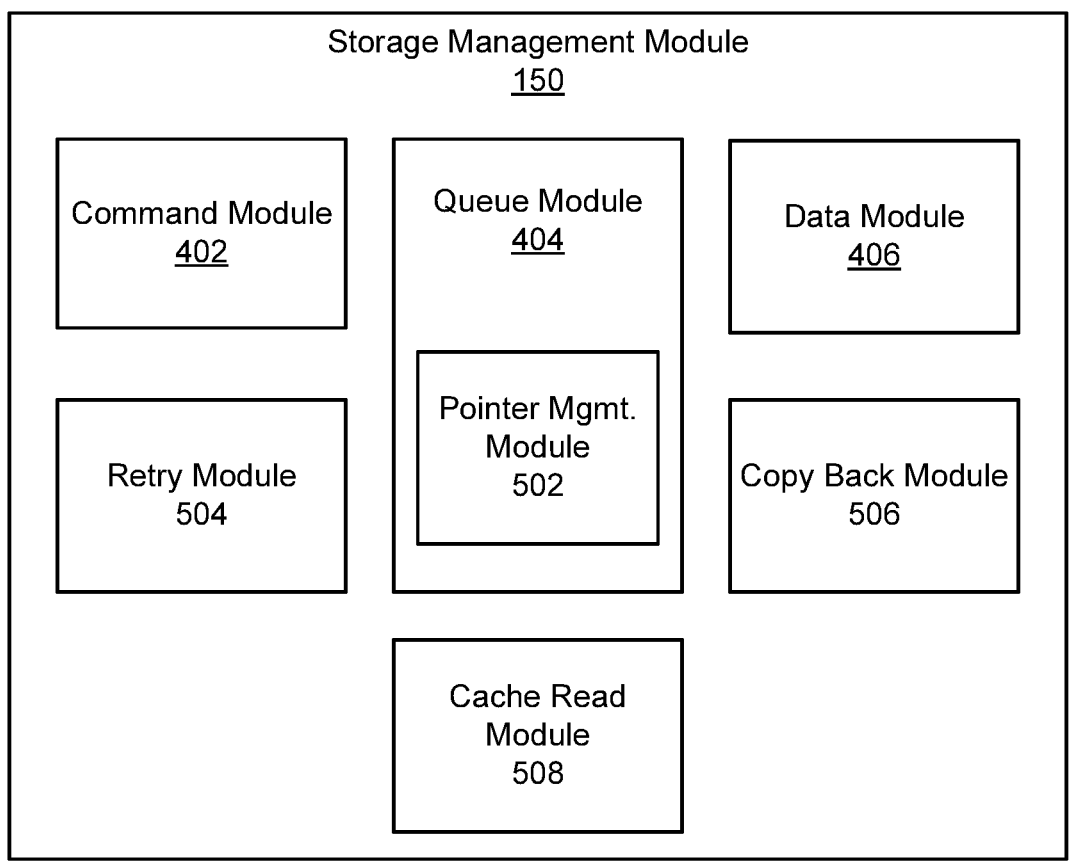
FIG. 5 is a schematic block diagram illustrating another embodiment of a storage management module.

FIG. 5 depicts one embodiment of a storage management module 150. The storage management module 150 may be substantially similar to the storage management module 150 described above with regard to FIG. 1. In the depicted embodiment, the storage management module 150 includes a command module 402, a queue module 404, and a data module 406, which may be substantially similar to the command module 402, the queue module 404, and the data module 406 described above with reference to FIG. 4. Furthermore, in one embodiment, the storage management module 150 includes a pointer management module 502, a retry module 504, a copy back module 506, and a cache read module 508, which are described in more detail below.

The pointer management module 502, in one embodiment, maintains one or more pointers, references, or the like, to a storage location in the page register 308 for data, addresses, and/or the like associated with a storage operation command. As used herein, a pointer is a reference to an address, memory location, or the like in the page register 308 for data or addresses associated with a storage operation. The one or more pointers, in some embodiments, include a pointer to a storage location for data associated with a current program/write operation, a pointer to a storage location for data associated with a queued program/write operation, a pointer to a storage location for data associated with a read operation, and/or the like. In one embodiment, the pointer management module 502 may direct the various pointers to particular latches, storage locations, addresses, memory locations, or the like in the page register 308 that have been predefined as storage locations for particular storage operation commands, such as read commands and write commands.

For example, the pointer management module 502 may direct a read pointer to a storage location in the page register 308 that is designated for data read from a bank 306 or bank group 304 of the memory array 301 where it is stored. In such an embodiment, there may be other storage commands that are queued to be processed before the read request is committed or finished, e.g., before the read request data is transferred from the page register 308 to a storage client 116, but because the pointer management module 502 maintains a pointer to the read request data in the page register 308, and because only a portion or subset of the page register 308 is being used to store the read request data, the read request command can be queued, e.g., tracked by being pointed to, for execution and finished or committed when the previously queued storage operation commands are completed.

In another example, the pointer management module 502 maintains a current write pointer to a storage location in the page register 308 where data is stored for a write or program command that is currently being processed, or is queued to be processed. Furthermore, the pointer management module 502 maintains one or more queued or next pointers to storage locations in the page register 308 where data is stored for queued write or program commands that are next in line to be processed. For example, as described above, particular latches, addresses, memory locations, or the like of the page register 308 may be defined as storage locations for read data and write data associated with a bank 306 or bank group 304 of a memory array 301. In one particular example, if three sets of latches (e.g., three columns of eight, sixteen, thirty-two, or the like 8-bit latches) of the page register 308 are designated as storage locations for data associated with write operations, e.g., for a particular memory bank 306, the pointer management module 502 may direct a current pointer to the address of the first set of latches, and a next/queued pointer to the address of the second set of latches. The third set of latches may be used as an additional buffer or overflow, e.g., in the event that a write operation is unsuccessful and needs to be retried, as described below.

Thus, in one example, if the data module 406 receives data for a write request and stores the data in a first set of latches of the page register 308, the pointer management module 502 may direct a current pointer to the address of the first set of latches to indicate the data for the current write request, e.g., the next write request in the queue. If the data module 406 receives data for another write request, while the first write request is still queued, the data module 406 will store data in the second set of latches of the page register 308, and the pointer management module 502 may direct the next/queued pointer to the address of the second set of latches to indicate the data for the next write request. Accordingly, when the write request is executed using the data pointed to by the current pointer, e.g., the data in the first set of latches, the pointer management module 502 may redirect the current pointer to the second set of latches to indicate the data of the next write request, which is now the current write request. The pointer management module 502 may then redirect the next/queued pointer to the third set of latches, to the first set of latches, to NULL, or the like until another write request is queued.

Furthermore, in one embodiment, the pointer management module 502 maintains a validity bit associated with each pointer that indicates whether data stored in the page register 308 at the storage location associated with the pointer is valid. For example, during a read request operation, the data module 406 may receive data from a bank 306 of the memory array 301 and store the data in a set of latches in the page register 308. The pointer management module 502 may direct the read pointer to the set of latches and set a validity bit for the set of latches that indicates that the data stored in the set of latches is valid. Once the data is read from the page register, e.g., transmitted to a storage client 116, the pointer management module 502 may then invalidate, reset, or the like the validity bit to indicate that the data stored in the set of latches is no longer valid, e.g., because it has been transmitted or processed to satisfy the read request.

In one embodiment, the pointer management module 502 maintains a pointer to a storage location for data that is queued to be written to the memory array 301, but was unsuccessfully written to the memory element 300 during the program/write operation. For example, if a write operation for the data pointed to by the current pointer was attempted, but failed for some reason, e.g., a program error, an incomplete program, or the like, the pointer management module 502 may increment or redirect the current and next pointers to point to different storage locations for data associated with queued write operations, to prepare the queued data to be written to a bank 306 or bank group 304. Because the write operation failed, the pointer management module 502 may not reset the validity bit so that additional attempts to write the data to the memory array 301 may be performed. In such an embodiment, the pointer management module 502 may direct an "unsuccessful" pointer to the data that failed to be written to the memory array 301, and may set an "unsuccessful" bit to indicate that the unsuccessful pointer is pointing to data that failed and needs to be written to the memory array 301.

In one embodiment, the retry module 504 may attempt to write data to the memory array 301, to a bank 306 or bank group 304 of the memory array 301, or the like that is pointed to by the unsuccessful pointer based on the unsuccessful bit being set. The retry module 504 may attempt to write the previously failed data to the memory array 301 until the data is written, until a threshold number of write attempts has been satisfied, or the like. If the data is successfully written to the memory array 301, the pointer management module 502 may reset the unsuccessful bit and redirect the unsuccessful pointer to point to NULL, or another invalid location, until a data for a write request fails to successfully be written to the memory array 301.

In some embodiments, if the unsuccessful pointer is directed to valid data, as indicated by the validity pointer, that has failed to be written to the memory array 301, the data may be overwritten by new data for a new write operation if there are no available storage locations in the page register 308 associated with a bank 306 or bank group 304 of the memory array 301. For example, if three sets of latches of the page register are associated with a bank 306 or bank group 304, and the current pointer points to a first set of latches containing valid data, the next pointer points to a second set of latches containing valid data, and the unsuccessful pointer points to a third set of latches containing valid data that has already been attempted to be written to the memory array 301, the data module 406 may overwrite the data in the third set of latches that the unsuccessful pointer points to with the new data. In such an embodiment, the data module 406 may send a notification, message, or the like to the storage client to indicate that the data was not successfully written to the memory array 301. Furthermore, in this embodiment, the pointer management module 502 may update the unsuccessful pointer so that it does not point to a set of latches in the page register 308 for the bank 306 or bank group 304 until a failed write occurs again.

Accordingly, if the unsuccessful pointer is directed to a storage location that contains valid data, the current and next pointers may alternate between the remaining storage locations until the storage location pointed to by the unsuccessful pointer becomes available. In this manner, subsets of the page register 308 may be used as storage operation queues for each bank 306 or bank group 304, but not necessarily in a first-in, first-out manner. In other words, the pointer management module 502 may direct pointers to data for write operations while maintaining an order in which the write operations are received, e.g., using the current and next pointers; however, if the unsuccessful pointer is directed to valid data that was previously attempted to be written to a bank 306 or bank group 304, the retry module 504 may attempt to write the data referenced by the unsuccessful pointer out of order of the order in which the write operations were received.

In one embodiment, the copy back module 506 redirects a write pointer, such as the current or next pointers, to a storage location of the page register, e.g., a set of latches, that is storing data associated with a read request command so that the data may be "copied-back" to a bank 306 or bank group 304 of the memory array 301 in response to receiving a write request for the data. In this manner, the data may be read to the page register and copied back to the memory array 301 by simply manipulating read and write pointers for the page register 308 instead of performing unnecessary reads and writes.

Similarly, the cache read module 508, in one embodiment, redirects a read pointer to data pointed to by a write pointer, e.g., the current or next pointer, so that the data can be read from the page register in response to a read request command instead of waiting for the data to be written to the memory array 301 and then reading the data back out from the memory array 301 to satisfy the read request command. In this manner, it may be faster and more efficient to manipulate the read pointer so that the data that is queued to be written to the memory array 301 can be read from the page register 308 before it is written to the memory array 301.

Figure 6:
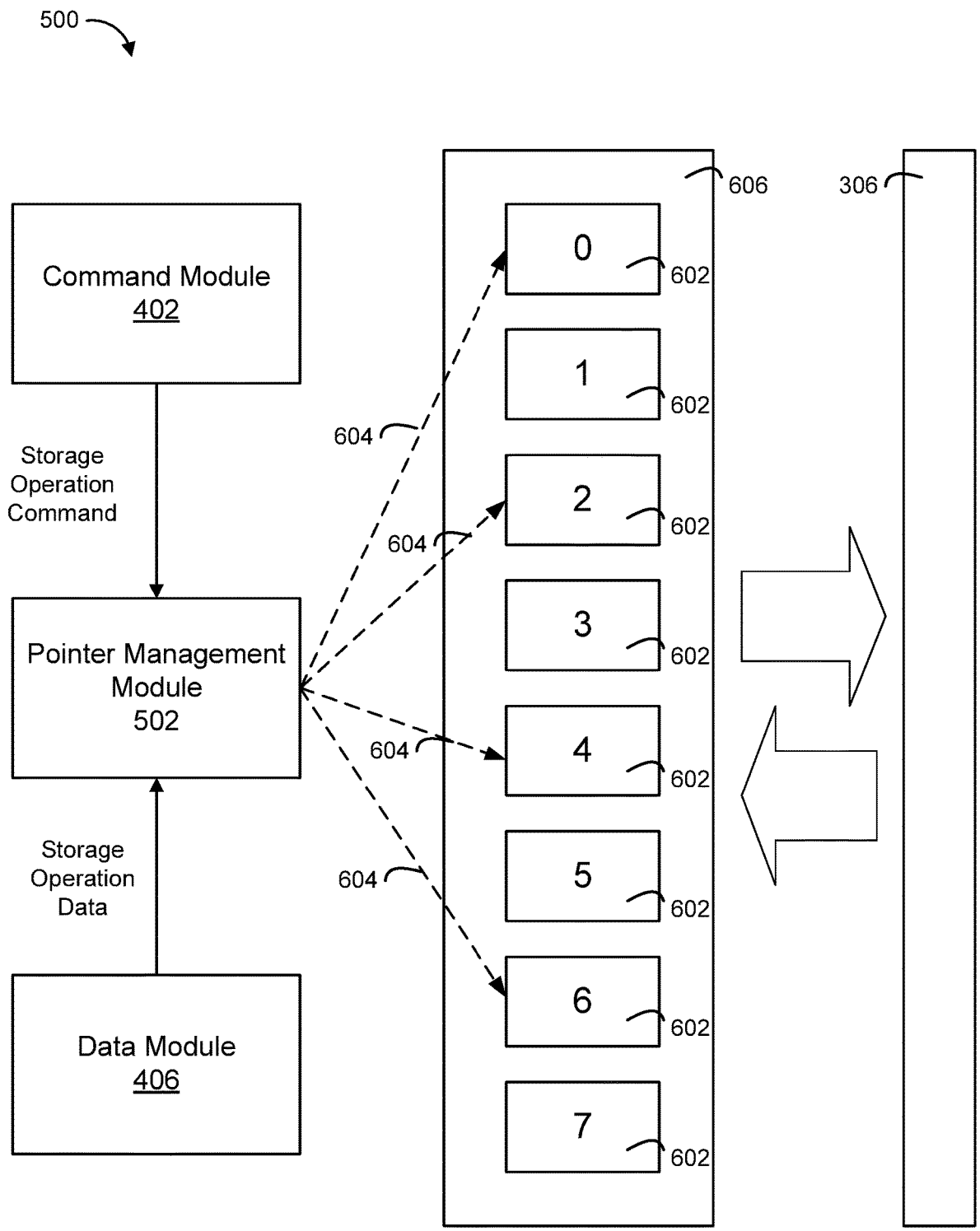
FIG. 6 is a schematic block diagram illustrating one embodiment of a dynamic storage operation queue.

FIG. 6 depicts one embodiment of using a portion 606 of a page register 308 for queuing storage operation commands for a bank 306 of memory cells 302. In one embodiment, the command module 402 receives a storage operation command. In response to receiving the storage operation command, the queue module 404 determines a storage location 602 in the portion 606 of the page register 308 for data associated with the storage operation command. As described above, the storage locations 602 within the page register 308 may be a subset, part, portion, or the like, of all the available storage locations in the page register 308. The subset 606 of the page register 308 may be associated with a particular bank 306 of memory cells 302 within the memory array 301.

In one embodiment, the pointer management module 502 maintains one or more pointers 604 that point to the storage locations 602 within the page register 308 that are designated for storing data associated with storage operation commands. For example, if the command module 402 receives a read request command, the pointer management module 502 may determine which pointer 604 is the read pointer, e.g., the pointer 604 directed to storage location 0, which may have been designated as the storage location 602 for storing read data. The data module 406 may receive data for the read request from the bank 306 in the memory array 301 and may store the data in storage location 0 pointed to by the read pointer. The read data may remain in storage location 0 until the read request operation is next in line in the storage operation queue to be processed (e.g., there may be previously received read or write commands that may be processed prior to this particular read request command).

In another example, the command module 402 may receive a write command to write data to the bank 306. The pointer management module 502 may determine a current pointer pointing to a storage location 602 in the portion 606 of the page register 308. If the current pointer is pointing to a storage location 602 that contains valid data, e.g., data that is queued to be processed, as indicated by the validity bit, the pointer management module 502 may then check a storage location pointed to by the next/queue pointer.

In a further embodiment, the pointer management module 502 maintains a commit bit, which, when set, indicates that a write command has been received for data referenced by the current pointer. The pointer management module 502, in a further embodiment, resets the commit bit in response to receiving an indication that the write operation finished successfully. If the pointer management module 502 determines that the write operation failed, or was otherwise unsuccessful (e.g., the write was incomplete), the pointer management module 502 may set the unsuccessful bit, ensure that the unsuccessful pointer references the data currently referenced by the current pointer, and shift the current and next pointers to the next set of data in the queue in the portion 606 of the page register 308. In this manner, by maintaining an unsuccessful pointer, the retry module 504 can attempt the write operation at a future time using the data referenced by the unsuccessful pointer until the write operation succeeds, until a threshold number of retry attempts has been made, or the like. In some embodiments, if the unsuccessful bit is not set, then the unsuccessful pointer may point to the same storage location as the current pointer, to a NULL location, and/or the like.

In one embodiment, when the data module 406 receives new data, the pointer management module 502 determines whether the data should be stored in a storage location 602 referenced by the current pointer or in a storage location referenced by the next pointer. To make this determination, the pointer management module 502 may check the commit bit and the validity bit associated with the current pointer. If the validity bit is set for the current pointer, indicating the data referenced by the current pointer is valid, then the data module 406 may store the data in a storage location 602 referenced by the next pointer. Similarly, if the commit bit is set, indicating that a write operation is being executed using data referenced by the current pointer, the data module 406 may store the data in a storage location 602 referenced by the next pointer. In various embodiments, if the current pointer and the next pointer, or each of one or more next pointers, contains valid data, as indicated by the validity bit, and there are no available storage locations 602 within the portion 606 of the page register 308, the pointer management module 502 and/or the data module 406 may throw, send, or the like an error message to indicate an error in storing and queuing the data for writing to the bank 306.

Furthermore, as described above, the pointer queue illustrated in FIG. 6 may not act as a typical first-in, first-out queue. For example, the read pointer may always point to storage location 0, but the current, next, and unsuccessful pointers may point to storage locations 2, 4, and 6 in various configurations. In one example, the current pointer may reference storage location 2 and the next pointer may reference storage location 4. If a write operation is executed using the data at storage location 2 referenced by the current pointer, the current pointer may be redirected to storage location 4, and the next pointer may be redirected to storage location 6. If the write operation fails, however, the unsuccessful pointer may then reference storage location 2. If another write operation is received for data in storage location 4 referenced by the current pointer, the current pointer may then be redirected to storage location 6. If storage location 2 is still referenced by the unsuccessful pointer, the next pointer may be redirected to storage location 4. Thus, the pointer management module 502 may direct and redirect the current/next/unavailable pointers to storage locations within the portion 606 of the page register 308 without any particular order, e.g., in an order the corresponds to availability of storage locations 602, while maintaining an order in which write operations are received; however, if a write operation was previously unsuccessfully attempted, the retry module 504 may attempt to write the data to the bank 306 out of order of the write operations associated with the current/next pointers.

Figure 7:
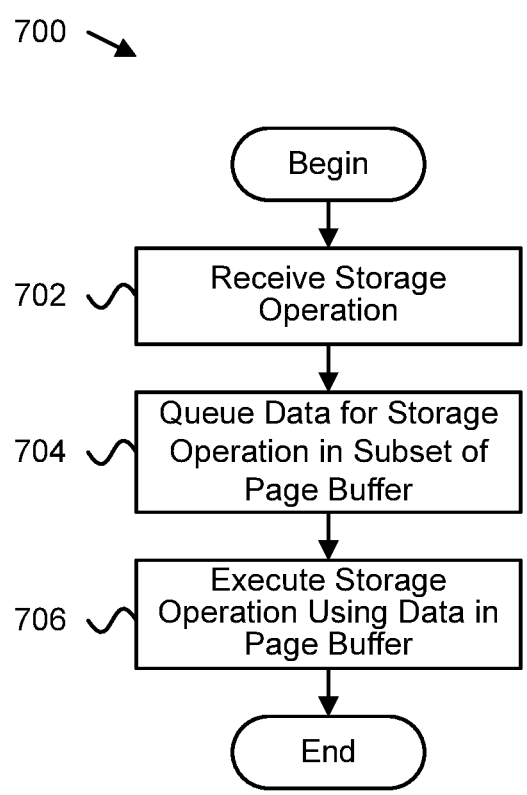
FIG. 7 is a schematic flow chart diagram illustrating one embodiment of a method for queuing storage operations.

FIG. 7 depicts one embodiment of a method 700 for queuing storage operation commands. In one embodiment, the method 700 begins and the command module 402 receives 702 a storage operation command associated with a bank 304 of storage locations of a memory array 301. In certain embodiments, the queue module 404 queues 704 the storage operation command for execution on the bank 306 by determining a storage location in a page register 308 for data associated with the storage operation command. The storage location in the page register 308 may comprise a subset of available storage locations in the page register 308. In a further embodiment, the data module 406 stores 706 data associated with the storage operation command at the determined storage location in the page register 308, and the method 700 ends.

Figure 8:
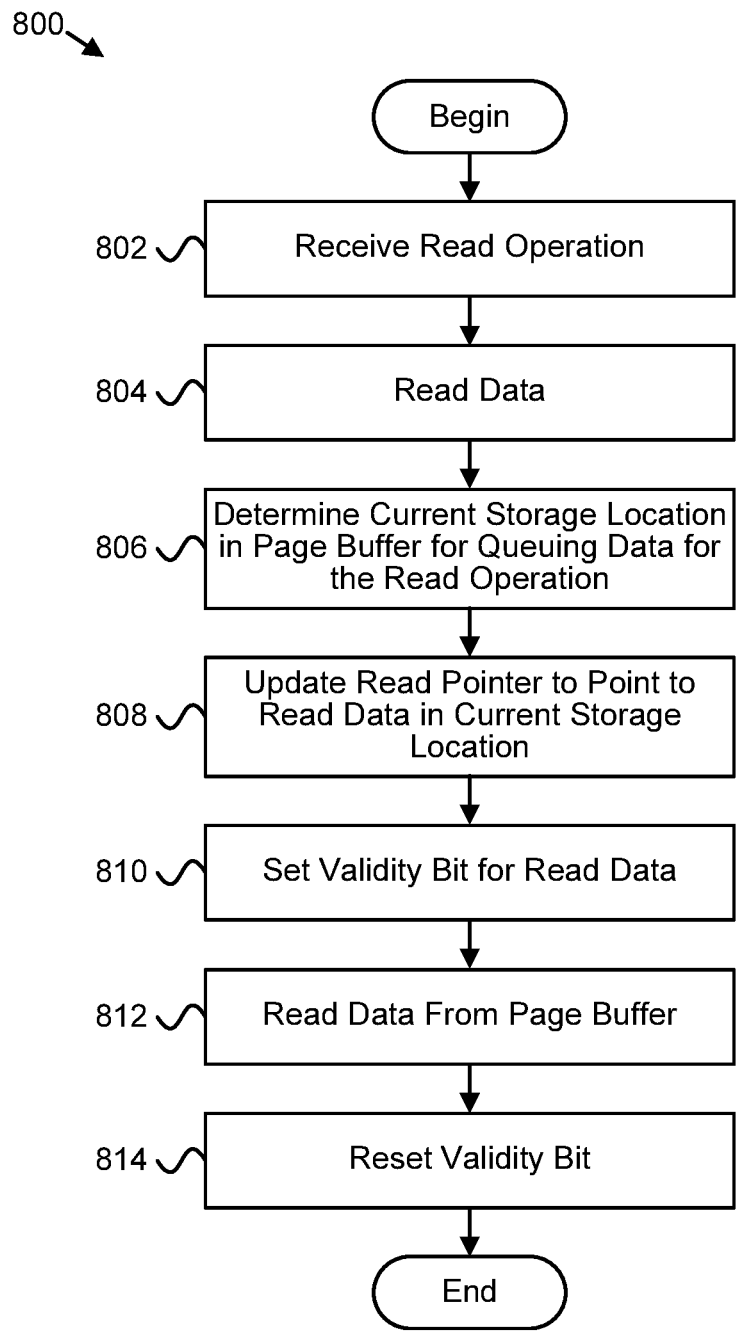
FIG. 8 is a schematic flow chart diagram illustrating a further embodiment of a method for queuing storage operations.

FIG. 8 depicts one embodiment of a method 800 for queuing storage operation commands. In one embodiment, the method 800 begins and the command module 402 receives 802 a read operation, e.g., a read request operation, to read data from one or more banks 306 of a memory array 301. In some embodiments, the data module 406 reads 804 data of the read request from one or more banks 304 of a memory array 301.

The queue module 406, in some embodiments, determines 806 a storage location in a page buffer 308 for where the data module 406 can store data of the read operation. The pointer management module 502, in one embodiment, updates 808 a read pointer to point to the determined storage location of the read data in the page buffer 308. In various embodiments, the pointer management module 502 sets 810 a validity bit for the read data that indicates the read data is valid data.

In a further embodiment, the data module 406 reads 812 the read data from the storage location pointed to by the read pointer in the page buffer 308, and transfers, transmits, copies, sends, or the like the read data to a storage client 116 that requested the data. The pointer management module 502, in one embodiment, resets 814 the validity bit after the read data is read 812 from the page register 308, and the method 800 ends.

Figure 9A:
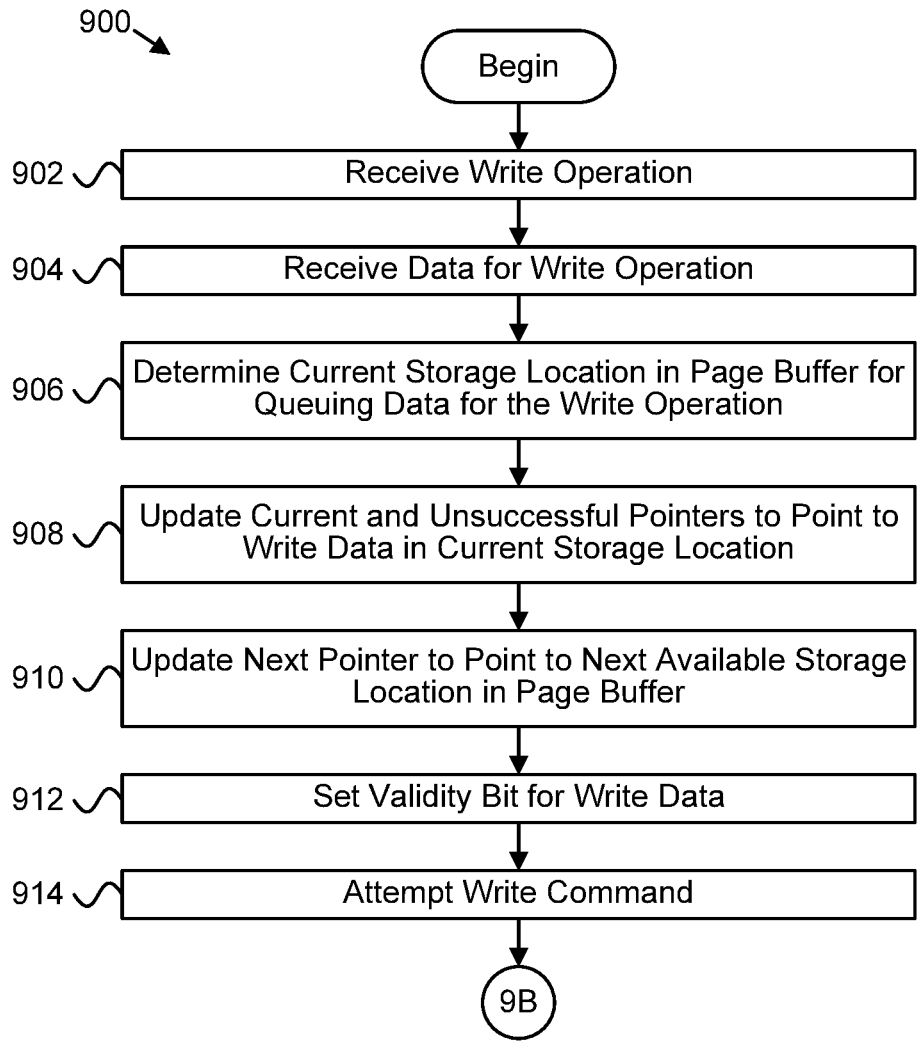
FIG. 9A is a schematic flow chart diagram illustrating another embodiment of a method for queuing storage operations.
Figure 9B:
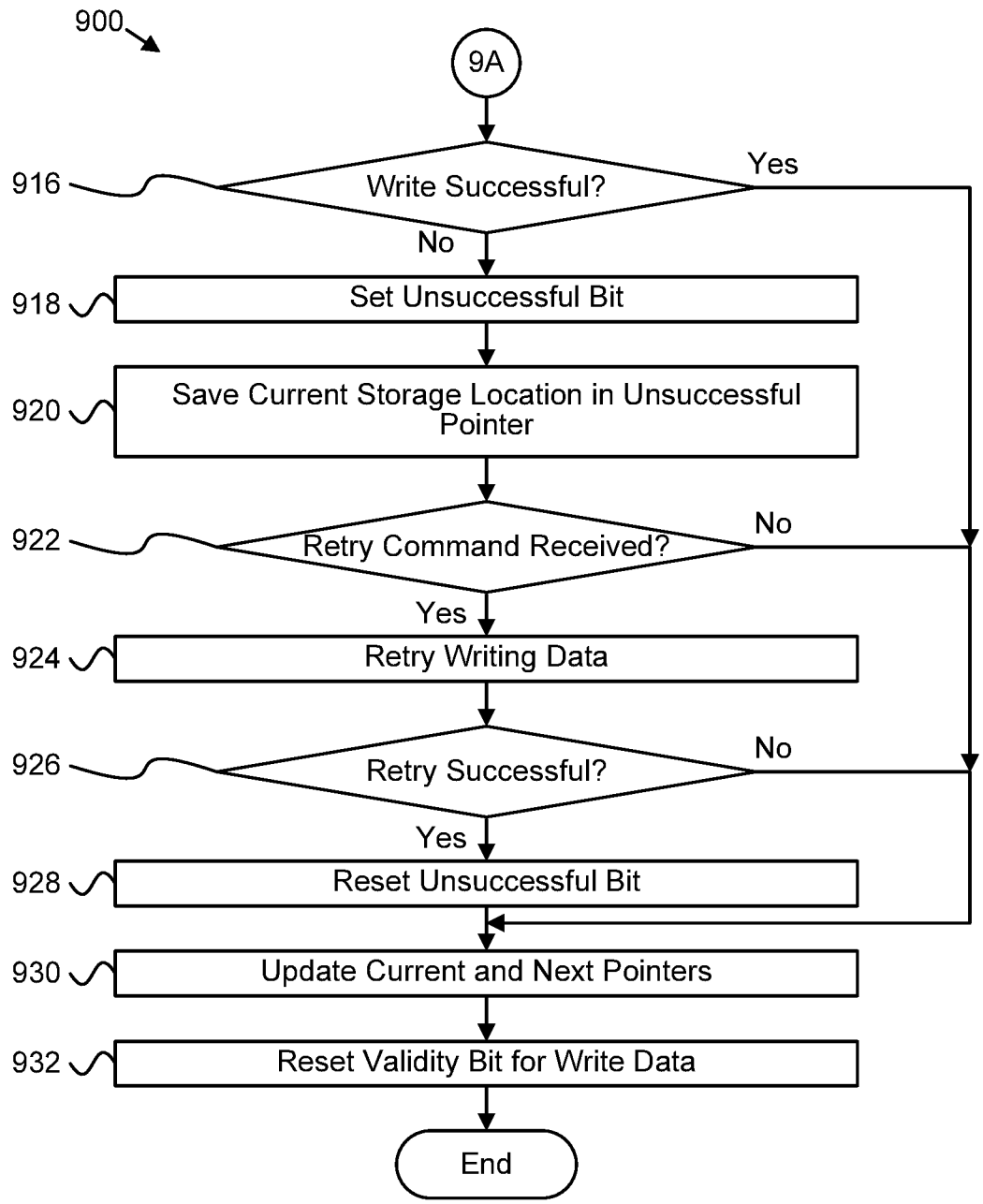
FIG. 9B is a schematic flow chart diagram illustrating a further embodiment of a method for queuing storage operations.

FIG. 9A and FIG. 9B depict one embodiment of a method 900 for queuing storage operation commands. In one embodiment, the method 900 begins and the command module 402 receives 902 a write operation command to write data to one or more banks 306 of the memory array 301. In a further embodiment, the data module 406 receives 904 data for the write operation, such as the data to be written to the memory array 301 and/or one or more addresses within the memory array 301 where the data is to be written.

In some embodiments, the queue module 404 determines 906 a current storage location in the page buffer 308 for queuing the data associated with the write request. In a further embodiment, the pointer management module 502 updates 908 a current pointer and an unsuccessful pointer to point to the storage location in the page buffer 308 where the data is stored. In one embodiment, the pointer management module 502 updates 910 a next pointer to point to the next available storage location in the page buffer 308 for data associated with the next storage operation command that is received.

In certain embodiments, the pointer management module 502 sets 912 a validity bit for the data to indicate that the data pointed to by the current pointer is valid, e.g., the data has not yet been processed. The data module 406, in one embodiment, attempts 914 the write command to write the data in the page register 308 to the memory array 301. In a certain embodiment, the pointer management module 502 determines 916 whether the attempt to write the data pointed to by the current pointer is successful.

In one embodiment, if the write is successful, the pointer management module 502 updates 930 the current and next pointers by directing the current pointer to the storage location in the page register 308 where the next pointer is currently pointing, and directing the next pointer to the next available storage location or the next data that is queued to be written to the memory array 301. In some embodiments, the pointer management module 502 resets 932 the validity bit for the data in the page buffer 308 that was written to the memory array 301, and the method 900 ends In another embodiment, if the pointer management module 502 determines 916 that the attempt to write the data pointed to by the current pointer is unsuccessful, the pointer management module 502 sets 918 an unsuccessful bit, and saves 920 the current storage location in the unsuccessful pointer. In one embodiment, if a retry command is not received 922, the pointer management module 502 updates 930 the current and next pointers, and the method 900 continues as if the write was successful. In another embodiment, if a retry command is received 922 from the controller 244, the retry module 504 retries 924 writing the data pointed to by the unsuccessful pointer to the memory array 301.

If the retry module 504 is successful 926 in retrying 924 the write, the pointer management module 502 resets 928 the unsuccessful bit, updates 930 the current and next pointers, and the method 900 continues. If the retry module 504 is not successful 926 in retrying 924 the write, the unsuccessful bit is not reset, and the method 900 continues (e.g., with the pointer management module 502 updating 930 the current and next pointers as if the write had been successful, or with another retry command being received 922 from the controller 244). In certain embodiments, the controller 244 may coordinate with the retry module 504 to continue to retry 924 to write the data to the memory array 301 until it is successful, until a threshold number of write attempts is satisfied, or the like.

A means for buffering storage operation commands associated with a memory array 301 of a non-volatile storage device using a page register 308, in various embodiments, may include a command module 402, a queue module 404, a pointer management module 502, a non-volatile storage device interface 139, a non-volatile memory medium controller 126, a storage client 116, a host computing device 110, a bus 127, a network 115, a controller (e.g., a die controller 220, a state machine 222, a controller 244, a device driver, or the like), a sense amplifier 250, a voltage source, a processor 111, other logic hardware, and/or other executable code stored on a computer readable storage medium. Other embodiments may include similar or equivalent means for buffering storage operation commands associated with a memory array 301 of a non-volatile storage device using a page register 308.

A means for storing data for the storage operation commands in the page register 308, in various embodiments, may include a data module 406, a non-volatile storage device interface 139, a non-volatile memory medium controller 126, a storage client 116, a host computing device 110, a bus 127, a network 115, a controller (e.g., a die controller 220, a state machine 222, a controller 244, a device driver, or the like), a sense amplifier 250, a voltage source, a processor 111, other logic hardware, and/or other executable code stored on a computer readable storage medium. Other embodiments may include similar or equivalent means for storing data for the storage operation commands in the page register 308.

A means for processing the data stored in the page register 308 for at least a subset of the storage operations, in various embodiments, may include a command module 402, a data module 406, a non-volatile storage device interface 139, a non-volatile memory medium controller 126, a storage client 116, a host computing device 110, a bus 127, a network 115, a controller (e.g., a die controller 220, a state machine 222, a controller 244, a device driver, or the like), a sense amplifier 250, a voltage source, a processor 111, other logic hardware, and/or other executable code stored on a computer readable storage medium. Other embodiments may include similar or equivalent means for processing the data stored in the page register 308 for at least a subset of the storage operations.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus comprising:
an integrated circuit ("IC") memory element configured to,
  receive a storage operation command associated with a bank of storage locations of the IC memory element;
  queue the storage operation command for execution on the bank of storage locations by determining a storage location in a page register for data associated with the storage operation command, the storage location in the page register comprising a subset of available storage locations in the page register;
  store data associated with the storage operation command at the determined storage location in the page register; and
  maintain one or more pointers to the storage location in the page register for the data associated with the storage operation command, wherein the one or more pointers comprise a pointer to a storage location for data that was queued to be written to the IC memory element, but was unsuccessfully written to the IC memory element.

2. The apparatus of claim 1, wherein the IC memory element is further configured to set an unsuccessful bit to indicate that the pointer is pointing to data that failed.

3. The apparatus of claim 2, wherein the IC memory element is further configured to reset the unsuccessful bit and redirect the pointer to an invalid location in response to subsequent successful writing of the data that was unsuccessfully written.

4. The apparatus of claim 1, wherein the storage operation command comprises a program command, the program command comprising one or more of a program flush command, an extended buffer flush command, and a refresh flush command.

5. The apparatus of claim 1, wherein the one or more pointers comprise:
  a pointer to a storage location for data of a current program operation;
  a pointer to a storage location for data of a queued program operation; and
  a pointer to a storage location for data of a read operation.

6. The apparatus of claim 1, wherein the IC memory element is further configured to retry to write the data pointed to by the pointer to the IC memory element subsequent to an unsuccessful write until a predetermined threshold number of retries is satisfied.

7. The apparatus of claim 1, wherein the IC memory element is further configured to retry to write the data pointed to by the pointer to the IC memory element in response to receiving one of a retry and a refresh storage operation command.

8. The apparatus of claim 1, wherein the IC memory element is further configured to maintain a validity bit associated with each pointer that indicates whether data stored in the page register at the storage location associated with the pointer is valid.

9. The apparatus of claim 1, wherein the IC memory element comprises a plurality of banks of storage locations that corresponds to a plurality of subsets of storage locations of the page register, the IC memory element simultaneously executing a plurality of storage operation commands associated with the plurality of banks of storage locations using data stored in the plurality of subsets of the page register.

10. The apparatus of claim 1, wherein the IC memory element is further configured to:
  direct a read pointer to a storage location of the page register for data of a read command;
  execute the read command on a first bank of the IC memory element;
  redirect a write pointer to the storage location of the page register for the data of the read command; and
  write the data of the read command to a second bank of the IC memory element.

11. A system comprising:
a non-volatile memory medium comprising a page buffer; and
a controller configured to,
  receive a plurality of storage operation commands for the non-volatile memory medium, wherein a storage operation command of the plurality of storage operations commands is for a subarray of a plurality of subarrays of the non-volatile memory medium;
  determine storage locations in the page buffer for concurrently storing data associated with the plurality of storage operation commands;
  execute at least two of the plurality of storage operation commands simultaneously using data stored in the page buffer associated with the at least two storage operation commands;
  maintain one or more references to a storage location in the page buffer for the data associated with the storage operation command, the one or more references comprising a reference to a storage location for data that was queued to be written to a subarray of the non-volatile memory medium and was unsuccessfully written to the subarray of the non-volatile memory medium; and
  retry to write the data pointed to by the unsuccessful reference in response to receiving one of a retry and a refresh storage operation command.

12. The system of claim 11, wherein the controller is further configured to queue a storage operation command for execution in response to a current storage operation command being processed, wherein data for the queued storage operation command is stored in a storage location of the page buffer that is associated with a subarray of the non-volatile memory medium on which the current storage operation is executing.

13. The system of claim 11, wherein the controller is further configured to set an unsuccessful bit to indicate that the unsuccessful reference is pointing to data that failed.

14. The system of claim 13, wherein the controller is further configured to reset the unsuccessful bit in response to a successful write of the data that failed.

15. The system of claim 14, wherein the controller is further configured to redirect the unsuccessful pointer to point to an invalid location in response to the successful write of the data that failed.

16. The system of claim 11, wherein the plurality of storage operation commands comprises a program command, the program command comprising one or more of a program flush command, an extended buffer flush command, and a refresh flush command.

17. The system of claim 16, wherein the one or more references comprise:
- a reference to a storage location for data of a current program operation;
- a reference to a storage location for data of a queued program operation; and
- a reference to a storage location for data of a read operation.

18. The system of claim 11, wherein the controller is further configured to retry to write the data pointed to by the unsuccessful reference until a predetermined threshold number of retries is satisfied.

19. The system of claim 11, wherein the controller is further configured to maintain a validity bit associated with each reference that indicates whether the data stored in the page buffer at the storage location associated with a reference is valid.

20. An apparatus comprising:
- means for buffering a plurality of storage operation commands associated with a plurality of subarrays of a non-volatile storage device using a page register of the non-volatile storage device;
- means for storing data for the plurality of storage operation commands in the page register, wherein data for each of the storage operation commands is smaller than a page size of the page register such that data for each of the plurality of storage operation commands is stored concurrently in the page register;
- means for simultaneously processing the data stored in the page register for at least a subset of the plurality of storage operation commands;
- means for maintaining an unsuccessful reference to a storage location in the page register for data that was queued to be written to a subarray of the plurality of subarrays and failed to write to the subarray; and
- means for retrying to write the data pointed to by the unsuccessful reference in response to receiving a retry command.

* * * * *